United States Patent
Stroh et al.

(10) Patent No.: US 6,887,304 B2
(45) Date of Patent: May 3, 2005

(54) METHOD FOR PRODUCING A HOLLOW FIBER MEMBRANE MODULE OR A CAPILLARY MEMBRANE MODULE

(75) Inventors: Norbert Stroh, Magstadt (DE); Katja Stein-Roeder, Althengstett (DE); Thomas Höfler, München (DE); Uwe Herterich, Stuttgart (DE)

(73) Assignee: Fraunhofer-Gesellschaft zur Forderung der angewandten, Munich (DE)

( * ) Notice: Subject to any disclaimer, the term of this patent is extended or adjusted under 35 U.S.C. 154(b) by 0 days.

(21) Appl. No.: 10/471,091

(22) PCT Filed: Mar. 15, 2002

(86) PCT No.: PCT/DE02/00941

§ 371 (c)(1),
(2), (4) Date: Nov. 10, 2003

(87) PCT Pub. No.: WO02/074423

PCT Pub. Date: Sep. 26, 2002

(65) Prior Publication Data

US 2004/0144712 A1 Jul. 29, 2004

(30) Foreign Application Priority Data

Mar. 16, 2001 (DE) .......................................... 101 12 863

(51) Int. Cl.[7] ......................... B01D 53/22; B01D 63/04; B01D 71/02

(52) U.S. Cl. ............................ 96/8; 96/10; 210/321.89; 210/500.23; 264/629; 264/643

(58) Field of Search ..................... 96/8, 10; 210/321.89, 210/500.23, 510.1, 523; 264/629, 630, 643

(56) References Cited

U.S. PATENT DOCUMENTS

| | | | | | |
|---|---|---|---|---|---|
| 2,961,062 | A | * | 11/1960 | Hunter et al. | 96/8 |
| 3,269,817 | A | * | 8/1966 | Bondley | 65/393 |
| 5,194,154 | A | | 3/1993 | Moyer et al. | |
| 5,198,007 | A | | 3/1993 | Moyer et al. | |
| 5,282,964 | A | * | 2/1994 | Young et al. | 210/321.8 |
| 5,611,931 | A | * | 3/1997 | Liu et al. | 210/653 |
| 5,662,843 | A | * | 9/1997 | Monzen et al. | 264/41 |
| 6,174,490 | B1 | | 1/2001 | Brinkman et al. | |
| 6,270,714 | B1 | | 8/2001 | Azran et al. | |
| 6,566,290 | B2 | * | 5/2003 | Beall et al. | 501/128 |
| 2002/0179516 | A1 | * | 12/2002 | Behrendt et al. | 210/321.8 |

FOREIGN PATENT DOCUMENTS

| DE | 42 09 405 A1 | 9/1993 |
|---|---|---|
| DE | 198 60 056 C2 | 7/1999 |

* cited by examiner

*Primary Examiner*—Robert H. Spitzer
(74) *Attorney, Agent, or Firm*—Breiner & Breiner, L.L.C.

(57) ABSTRACT

The invention relates to a method for producing a hollow fiber membrane module or a capillary membrane module as well as a device having such a module. In the method, hollow fibers or capillaries are placed, in an unsintered state, in a mold structured for receiving the hollow fibers or capillaries and are sintered once inside the mold. Subsequently or simultaneously, the fibers are potted in the mold. The method permits producing hollow fiber membrane modules or capillary membrane modules in a simple manner with little risk of breakage.

20 Claims, 2 Drawing Sheets

METHOD FOR PRODUCING A HOLLOW FIBER MEMBRANE MODULE OR A CAPILLARY MEMBRANE MODULE

BACKGROUND OF THE INVENTION

1. Technical Field

The present invention relates to a method for producing a hollow fiber membrane module or a capillary membrane module in which the hollow fibers or capillaries made of a ceramic or a material with a ceramic content are introduced into a mold structured for receiving the hollow fibers or capillaries and are potted in the mold with a potting compound. In addition, the present invention relates to a device having a hollow fiber membrane module or a capillary membrane module produced according to the present method.

In the present invention, hollow fibers refers to pipe-shaped bodies with an external diameter in the range from approximately >10 µm to 0.5 mm, capillaries refers to bodies with an external diameter between 0.5 and 3 mm.

The present method and device are primarily employed in filtration and separation technology. In these technologies, among other things, inorganic membranes in the form of modules are utilized as separation tools for the filtration of liquids as well as the separation of gases. The hollow fiber membrane module or capillary membrane module produced with the present method can be utilized for separation of, respectively purification of, gases and vapors, in particular in high-temperature applications, as well as for the filtration of liquids in micro-filtration, ultra-filtration and nano-filtration and as a membrane reactor.

2. Prior Art

EP 0 941 759 A1 discloses a method for producing a hollow fiber membrane module in which the sintered hollow fibers are introduced into a mold and are potted in this mold with a potting compound. A ceramic-containing compound is used as the potting compound, which is then hardened respectively solidified in a suited thermal step. The mold for receiving the hollow fibers is designed as a perforated plate, which then is fitted with the fibers potted inside it into a housing.

Production of a hollow fiber membrane module according to the method of this printed publication is, however, difficult as the sintered hollow fibers have a great propensity to break as is characteristic of ceramics. It is not easy to handle such type sintered hollow fibers so that insertion into the openings of the mold designed as a perforated plate is difficult and can lead to the hollow fibers breaking.

EP 0 938 921 A1 discloses another method for producing a hollow fiber membrane module. In this method, a bundle of sintered hollow fibers is placed in a cylindrical mold and is potted in this mold while the potting compound is impinged with ultrasound.

However, in this method too the hollow fibers can break very easily.

The object of the present invention is to provide a method for producing a hollow fiber membrane module or a capillary membrane module as well as a device having such a module, which is easy to produce and with less risk of the hollow fibers or capillaries breaking.

SUMMARY OF THE INVENTION

The object is solved with the method and the device according to the claims. Advantageous embodiments of the method and the device are the subject of the subclaims.

In the present method for producing a hollow fiber membrane module or capillary membrane module, hollow fibers or capillaries made of ceramic or a material with a ceramic content in an unsintered state, i.e. as green fibers, are placed in a mold structured for the reception of hollow fibers or capillaries. The hollow fibers or capillaries are not sintered until once inside this mold in a thermal process step. The hollow fibers or capillaries are potted, either before or after sintering, with a potting compound, which connects them with the mold. This casting process is familiar to someone skilled in the art under the term potting, the casting compound is called the potting compound. The potting compound is then hardened respectively solidified in such a manner that a hollow fiber membrane module respectively a capillary membrane module is created which can be placed in a housing and utilized in technical systems.

Solidification of the potting compound may occur, for example by means of a thermal process step. If a ceramic material is employed as the potting compound sintering of the hollow fibers respectively the capillaries and hardening can, therefore, occur in the same thermal step. This technique is referred to as cofiring.

In the present method, the hollow fibers respectively the capillaries are not inserted into respectively not placed in a structured mold in a sintered state but in a green state. This mold is then part of the hollow fiber membrane module respectively of the capillary membrane module and is shaped in such a manner that the hollow fibers respectively capillaries can be received in it. The mold can, for example, be made of a porous ceramic or other inorganic materials, such as for example metal or glass. Exemplary versions of preferred embodiments are grooved or corrugated, plate-like bodies or star-shaped bodies which, due to their geometry, have recesses to receive the fibers or capillaries. Placing the fibers in the mold can occur manually or mechanically. After being placed in the mold, the green fibers are sintered and potted.

There are various possible available methods for potting, such as for example spinning, casting or tampon pressure. After the potting compound, preferably a ceramic or a polymer, has hardened, the hollow fiber ends respectively the capillary ends are cut off in such a manner that the lumina of the fibers are open. Cutting off the fiber ends can occur by means of a suited severing method, for example using a diamond wire saw, by means of water jet blasting technology or by means of laser cutting technology.

With the proposed method, production of hollow fiber membrane modules or capillary membrane modules can be significantly simplified. Handling of the green fibers and placing them in a mold are rendered significantly easier and lead to far less breakage than when placing sintered fibers in a mold designed, for example, as a perforated plate respectively inserting a bundle of sintered fibers into a cylindrical body. It surprisingly turned out that the ceramic hollow fibers respectively capillaries do not connect during sintering but rather remain separate. It is this surprising teaching of the inventors that makes producing a hollow membrane module or a capillary membrane module with the present method possible.

With this method fiber breakage and other defects can be prevented during production of the module. The fibers can, for example, be placed in bundles into the structured mold. During the subsequent drying and sintering process, distortion respectively fraying of the fibers is prevented due to the external molding by the mold.

In addition to this, using a ceramic potting compound obviates utilizing two separate thermal treatment steps. But rather sintering the hollow fibers respectively the capillaries and solidifying respectively sintering the ceramic potting compound can occur in the same thermal treatment step. In this case, the thermal expansion coefficients of the materials for the hollow fibers respectively for the capillaries and the potting compound must be matched in order to prevent the development of excessive mechanical tension.

The hollow fibers or capillaries can be provided in a prior art manner as green fibers respectively in a green state. They can be obtained by spinning respectively by extrusion of inorganic or metal organic compounds, such as preliminary polymer stages or inorganic binder-containing suspensions of aqueous solutions of salts or of powder filled sol/gels. Hollow fibers or capillaries produced in this manner are flexible and easy to handle in a green state. In a sintered respectively pyrolyzed state, the hollow fibers or capillaries, such as employed in the present method can be composed of oxidic substances such as $ZrO_2$, $TiO_2$, $\alpha$-$Al_2O_3$, $\gamma$-$Al_2O_3$, $3Al_2O_3*2SiO_2$ (mullite), $MgAl_2O_4$ (spinel), $SiO_2$, of perowskites, hydroxylapatite, zeolites, nonoxidic substances such as SiBNC, Sic, BN, $Si_3N_4$, C, as well as of metal such as copper, titanium, iron, special steels or transition metal alloys. This list is, of course, incomplete. Someone skilled in the art is familiar with suited materials for producing ceramic hollow fibers or capillaries.

The material of the potting compound can be composed of the same material as the hollow fibers respectively the capillaries or of another suited inorganic or organic material. The expansion coefficients of hollow fibers or capillaries and the potting compound should match. Preferably, the difference in expansion coefficient should be not greater than $5\times10^{-6}K^{-1}$. A higher thermal expansion coefficient of the fiber material can be tolerated more readily than the reverse.

The expansion coefficient of prior art materials for the potting compound respectively for the material for the hollow fibers respectively for the capillaries are $8\times10^{-6}K^{-1}$ for $Al_2O_3$, $10\times10^{-6}K^{-1}$ for $ZrO_2(Y_2O_3$ stabilized), $0.5\times10^{-6}K^{-1}$ for $SiO_2$, $8$–$10\times10^{-6}K^{-1}$ for $TiO_2$, $4.5\times10^{-6}K^{-1}$ for SiC. From these examples it is evident that there are numerous materials that meet the above condition of a minor difference in thermal expansion coefficients.

In addition to a thermal process step, for example drying, solidification of the potting compound to the corresponding green state can occur by changing the surface charge of the ceramic powder particles of this potting compound. Such a change in the surface charge can occur, for example, by means of enzymatic release of protons or hydroxyl ions.

For the intended use of the module produced according to the invented method as a technical process device in a system for liquid filtration or gas separation, the mold with the hollow fibers respectively the capillaries potted in it are placed in a suited housing. The geometry of the mold containing the hollow fibers respectively the capillaries and the housing are matched in such a manner that a so-called feed space for feeding the to-be-filtered medium and a so-called permeate space for the filtrate are formed, which are separated from each other in a gas tight manner by seals disposed in the housing outside the membrane area respectively filter area, which is formed in a prior art manner by the side walls of the hollow fibers respectively of the capillaries. The housing may be executed as a tight ceramic or as a metal cartridge system.

In an alternative preferred embodiment, the green fibers, mold and a ceramic housing can be potted in a single step with a suited potting compound of ceramic and sintered together (cofiring). In this method of production, the relationship between size of the mold and the length of the green fibers must be matched in such a manner that shrinking of the fibers during subsequent sintering is taken into account.

In addition to this, a module element produced in this manner can be provided with further ceramic coatings, such as for example of $\alpha$-$Al_2O_3$, $\gamma$-$Al_2O_3$, $MgAl_2O_4$, $TiO_2$, $ZrO_2$, etc. with metal or metal alloy coatings, such as for example of transition metals from the groups 4–6, 10, 11, in particular of alloys containing these transition metals, lave phases, metallic glasses or polymers such as for example polyimide. This additional coating permits obtaining gas separation membranes and/or increasing potting density.

A hollow fiber membrane module or capillary membrane module produced with the present method respectively with the proposed device with such a type module can be used in many technical fields of application. Examples are drying or moisturizing air (air conditioning), catalysis, cleaning hot gases, separation of gases, pervaporation, vapor permeation, heterogeneous catalysis, use in membrane reactors, in heat exchangers, in contactors, in fuel cells, as prefilters for purification, filtration of aggressive media such as hot acidic media and lyes or solvents, filtration of abrasive, toxic, microbiologically or otherwise contaminated liquids and the reprocessing of emulsions.

In the preceding description it was already made apparent that various fiber/potting compound material combinations can be employed. Therefore, both oxidic and nonoxidic respectively metallic materials can be used as the hollow fiber material respectively as the capillary material and as the potting material. Hollow fibers respectively capillaries (hereinafter for the sake of simplicity only referred to as fibers) and the potting may be composed of the same materials or of different materials. The porosity of the potting material must be less than the porosity of the fibers. In the case of a combination of a ceramic material for the fibers and a polymer for the potting, oxidic and nonoxidic respectively metallic materials can be used as the fiber material. In this case, polymers or organic materials, such as for example epoxy resins (filled and not filled systems) or silicones can be employed as potting materials. Here too, the porosity of the potting materials must be less than the porosity of the fibers.

Preferably, the receiving mold also has the same or a similar thermal expansion coefficient as the fibers and the potting material. In this manner, tensions are prevented during production of the module and in its subsequent use at high temperatures.

The proposed device comprises a module produced according to the present method in a housing. The mold with the fibers and the housing are adapted geometrically in such a manner that a feed space and a permeate space are formed which are separated gas tight from each other by seals or a sealing material between the mold and the housing but not within the membrane area. The housing has openings for the lumen inlet and lumen outlet of the fibers and for the exterior inlet and exterior outlet to respectively from the interior of the mold, which are preferably designed as connections. In the same manner the mold forms openings which permit feeding respectively removing gas or liquid via the corresponding exterior openings of the housing to the exterior walls of the fibers.

The housing with the fitted mold is preferably designed as a cartridge system, with the mold and the cartridge being sealed in a stuffing box-like manner between the lumen side and the exterior side of the fibers. The cartridge serves to adapt the device to the overall system. The interior of the receiving mold is accessible via the described openings in the periphery of the mold. The housing is preferably made of a metallic material.

BRIEF DESCRIPTION OF THE DRAWINGS

The method and the device are briefly described in the following using preferred embodiments with reference to the accompanying drawings without the intentions of limiting the scope or spirit of the inventive idea.

WAYS TO CARRY OUT THE INVENTION

Figure 1:
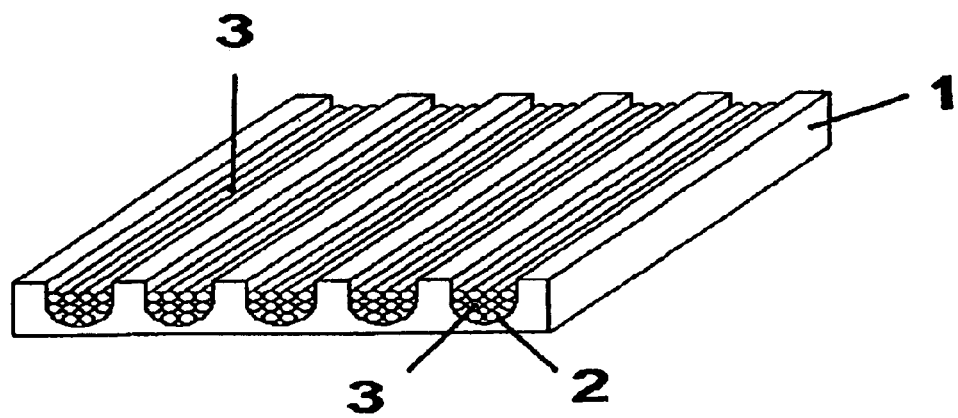
FIG. 1 shows a first example of a mold with hollow fibers placed in it.
Figure 2:
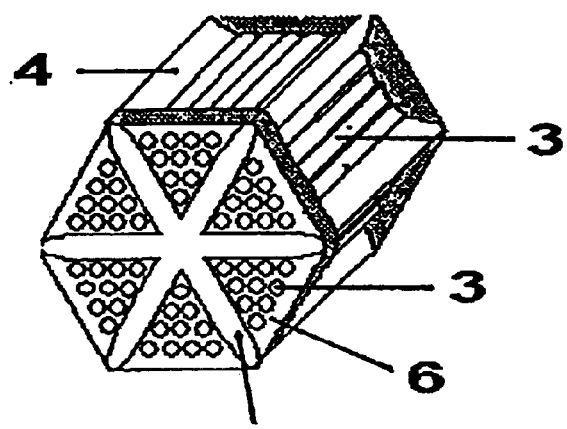
FIG. 2 shows a second example of a mold with potted hollow fibers.
Figure 3:
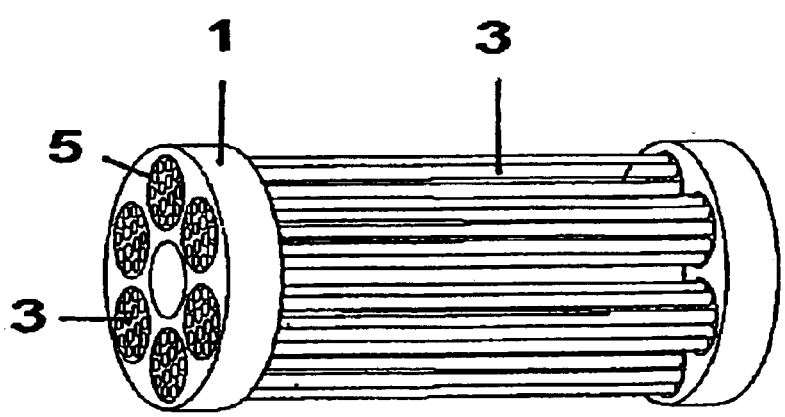
FIG. 3 shows a third example of a mold with potted hollow fibers.

FIGS. 1–3 show different examples of preferred embodiments of a mold 1, as is utilized in the present method. In the example of FIG. 1, mold 1 is executed as a grooved plate made of ceramic or metal. Hollow fibers 3 in a green state are placed, preferably in bundles, into the grooves 2 of the mold, as the figure shows. Following or simultaneously with the subsequent potting step, these fibers 3 are connected with mold 1.

The mold (1) of FIG. 2 is designed star-shaped and preferably made of a porous ceramic or porous metal. The hollow fibers 3 in a green state are placed in the recesses 4 formed by the star shape, sintered and simultaneously or subsequently potted.

FIG. 3 shows a third example, in which mold 1 is formed by two plates provided with hole openings 5. The green fibers are placed in these openings 5 and then sintered and potted. In this manner a module in the form of a multi-channel is formed, as FIG. 3 shows.

In all three examples, after the potting step fibers 3 are cut off where their ends protrude from mold 1 in order to expose the fiber lumen.

Figure 4:
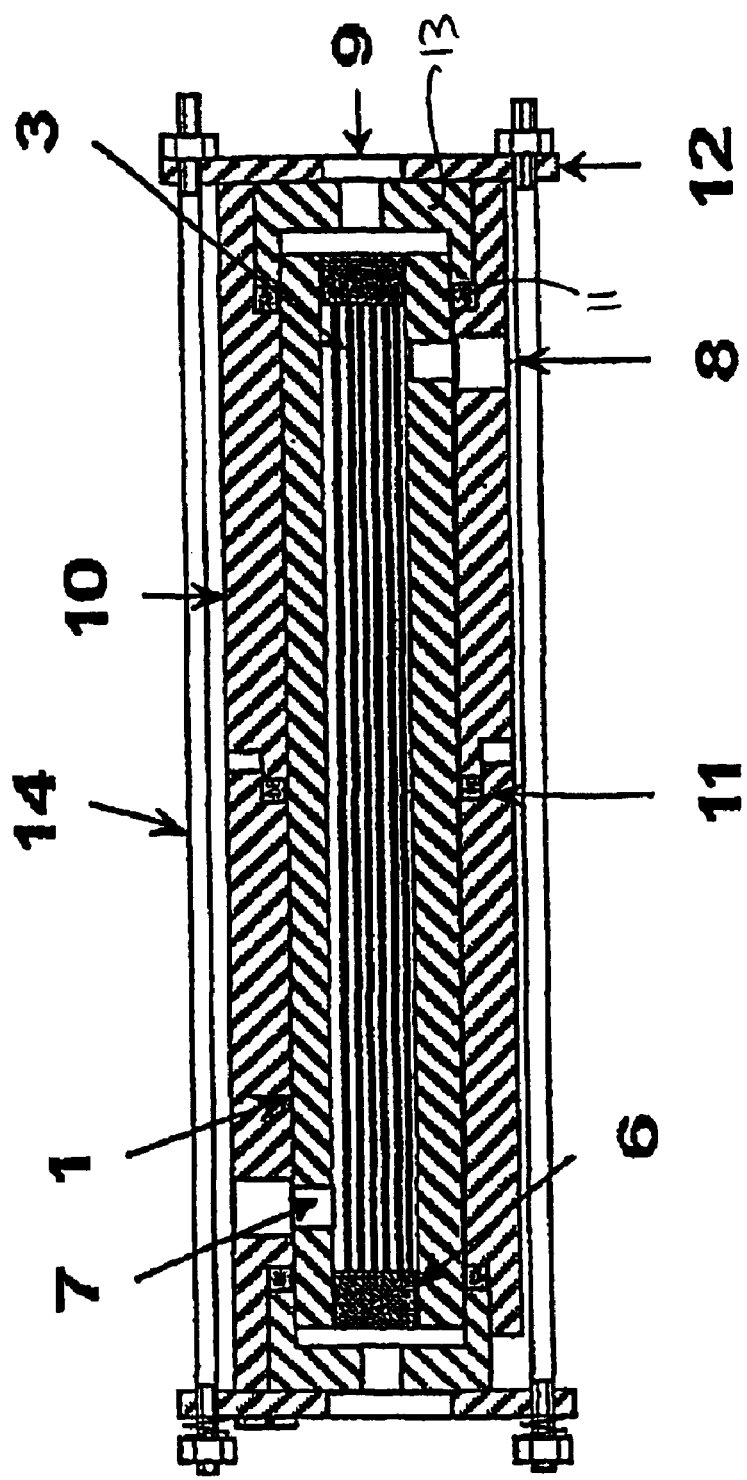
FIG. 4 shows an example of a preferred embodiment of the present device as a cartridge system.

Finally FIG. 4 shows an example of a preferred embodiment of the present device in the form of a cartridge system for insertion in a system for filtering liquids or for gas separation. The capillary membrane module or hollow fiber membrane module produced with the present method comprises in this example a cylindrical mold body 1 made of glass or ceramic. In this mold 1, the ceramic hollow fibers or capillaries 3 are potted at their ends. The potting compound bears the number 6. The material of mold 1 ideally has the same or a similar expansion coefficient as the ceramic hollow fibers respectively capillaries 3 so that no thermal tension develops.

Mold 1 bears in its periphery in the region of its front end and rear end in at least one access opening 7 respectively via which the liquids reach the interior of the mold and in this manner the outer sides of the ceramic hollow fibers or capillaries 3 respectively can be removed from the interior of mold 1. A cartridge 10 which is preferably made of metal or a high-temperature stable plastic bearing all the connections for the lumen inlet and lumen outlet as well as the exterior inlet and exterior outlet is pushed over this mold 1. The connection openings for the exterior inlet and exterior outlet 8 are located exactly over the access openings 7 of the mold.

The connections may be executed as threads or as welded hexagon nipples. The lumen connections 9 are attached to the housing 10 at the front and provide access to the lumen of the hollow fibers respectively capillaries 3. These connections are also preferably designed as threads or welded hexagon nipples. The diameter of mold 1 is adapted to the inner diameter of cartridge 10 in such a manner that there is only minimal play between the two. Preferably the two are connected in a form fitting manner. Seals 11, preferably square washers or O-ring seals, are provided between mold 1 and the inner walls of cartridge 10, on the one hand, in order to seal between the lumen inlet and lumen outlet as well as the exterior inlet and exterior outlet. The washers permit, on the other hand ensuring sealing between the exterior inlet and exterior outlet. Washers 11 may, for example, be made of high-temperature-tolerant polymers which are tolerant of high temperatures and preferably also tolerant of chemicals, such as for example polyimides, PTFE, Viton®, Kalrez®, silicon or of graphite or metals.

In addition to washers, the entire intermediate space between the mold body 1 and the cartridge 10 may also be filled with sealing material—with the exception of the inlet and outlet openings 7, 8 for the interior of the mold body 1—in such a manner that there is only minimum dead space.

Generating pressure force on the washers 11 can, for example, occur via swivel nuts, tie rods, or screws, with the thermal motion being offset via spring systems. The figure shows the use of a press plate 12 by means of which a pluglike designed body 13 is pressed on the outer washers 11 between mold body 1 and cartridge 10. The two press plates 12 are held together by threaded rods 14 with nuts.

A cartridge system as shown in FIG. 4 has the advantage that no thermal tension occurs in the capillaries or hollow fibers 3 from the receiving mold 1, and it simultaneously permits simple adaptation of the module to an entire system, for example a production system, via pipe connections.

Three examples of variants of preferred embodiments of the method for producing a hollow fiber membrane module are given in the following.

In the first example, $\alpha$-$Al_2O_3$ green fibers are utilized, which were produced according to the lycocell method of DE 44 26 966 A1. The fibers are placed in a green state in bundles on a corrugated mold made of porous $Al_2O_3$ ceramic, as for example shown in FIG. 1. The green fibers are sintered in this mold at 1450° C. After the sintering step, the ends of the fibers are potted (static potting) with a two-component epoxy-based adhesive compound (Biresin, hardener HM, SIKA Chemie) and the potting compound is hardened in air for 24 hours. Following this, the hollow fibers are cut together with the mold in such a manner that the lumina of the fibers are open. A plurality of such molds with hollow fibers are transferred into a housing, with plastic seals separating feed and permeate spaces gas-tight.

In a second method, $ZrO_2$ green fibers that were also produced according to the lycocell method are utilized. The fibers are placed in a green state in bundles in a star-shaped mold made of $Al_2O_3$ceramic in such a manner that the green fibers protrude beyond the boundary of the mold. The degree of protrusion of the green fibers is selected to compensate for the degree of shrinking during sintering (cf. FIG. 2). The inserted green fibers are sintered in the mold at 1200° C. Following the sintering step, the ends of the fibers are potted (static potting) with a silicon adhesive compound (Silicone AP, Dow Corning) and the potting compound is hardened in air for 24 hours. Then the hollow fibers are cut together with the mold in such a manner that the lumina of the fibers are open. The mold with the hollow fibers is then conveyed into a housing, with plastic seals separating the feed space from the permeate space.

In the last example of a preferred embodiment, $\alpha$-Al$_2$O$_3$ green fibers are produced according to the Monsanto method (DE 2919560 A1). The fibers are placed in a green state in bundles on a corrugated Al$_2$O$_3$ ceramic, as shown in FIG. 1. The green fibers are sintered in the mold at 1450° C. After sintering, the ends of the fibers are potted with a ceramic potting compound. The potting compound has the following composition:

1180 g Al$_2$O$_3$ (CL 370 C Alcoa)

1.76 g 4,5-dihydroxy-1,3 benzol disulfonic acid 3.54 g uric acid 109 g bidistilled water.

Just before casting, 2000 units of urease (EC 3.5.1.5) are added, which leads to rapid hardening of the potting compound.

After potting, the system is calcinated at 1450° C. After this, the hollow fibers are cut together with the mold in such a manner that the lumina of the fibers are open. A plurality of such molds containing hollow fibers is transferred into a housing with temperature stable seals, for example made of graphite, metals or HT polymers separating the feed space and the permeate space gas-tight. Yielded is a hollow fiber module which is suited for use at high temperatures.

If the ceramic potting compound is composed in such a manner that the shrinking rates of the fibers and the potting compound are approximately the same, after placing the green fibers in the mold the fibers can be potted immediately in a green state. Fibers and potting compound are then sintered in the mold in a single thermal treatment step (cofiring process).

LIST OF REFERENCE NUMBERS 1 mold respectively mold body
2 grooves
3 hollow fibers respectively capillaries
4 recesses
5 hole openings
6 potting compound
7 access openings of the mold
8 connections for exterior inlet and outlet
9 lumen connections
10 housing respectively cartridge
11 seals
12 press plates
13 plugs
14 threaded rods with nuts

What is claimed is:

1. A method for producing a hollow fibers membrane module or capillaries membrane module, in which the hollow fibers or the capillaries are composed of a ceramic material or a material including a ceramic content, comprising placing said hollow fibers or said capillaries in an unsintered state in a mold structured for receiving said hollow fibers or said capillaries, connecting said hollow fibers or said capillaries with said mold by potting with a potting compound, and sintering said hollow fibers or said capillaries in said mold.

2. A method according to claim 1, wherein the potting compound comprises a material including a ceramic content.

3. A method according to claim 2, wherein said sintering of said hollow fibers or said capillaries and hardening of said potting compound occur in a common thermal processing step.

4. A method according to claim 3, wherein material for said potting compound and the material for said hollow fibers or said capillaries are selected to have a thermal expansion coefficient which differs by less than $5*10^{-6}$ K$^{-1}$.

5. A method according to claim 2, wherein material for said potting compound and the material for said hollow fibers or said capillaries are selected to have a thermal expansion coefficient which differs by less than $5*10^{-6}$ K$^{-1}$.

6. A method according to claim 5, wherein the thermal expansion efficient of said material for said hollow fibers or said capillaries is equal to or greater than the thermal expansion coefficient of said material for said potting compound.

7. A method according to claim 2, wherein said ceramic content of said potting compound includes powder particles, and said method further comprises solidifying said potting compound by altering a surface charge of the powder particles.

8. A method according to claim 1, wherein the potting compound comprises a polymer or organic material.

9. A method according to claim 1, wherein said hollow fibers or said capillaries are placed in bundles in said mold.

10. A method according to claim 1, wherein said mold comprises porous ceramic or inorganic material.

11. A method according to claim 1, wherein said mold includes elongated recesses for reception of said hollow fibers or said capillaries.

12. A method according to claim 1, further comprising attaching said mold containing said hollow fibers or said capillaries to a housing by means of at least one seal in order to form a feed space and a permeate space which are separated from one another in a gas-tight manner by said at least one seal.

13. A method according to claim 12, wherein said potting of said hollow fibers or said capillaries in said mold occurs in said housing with said potting compound, and said sintering of said hollow fibers or said capillaries in said mold occurs following said attaching of said mold to said housing and as a thermal processing step to sinter said hollow fibers or said capillaries and to harden said potting compound.

14. A method according to claim 1, wherein said mold with said hollow fibers or said capillaries and said potting compound are provided with at least one coating.

15. A device having a hollow fibers membrane module or a capillaries membrane module provided according to one of claims 1 to 11 or 30 comprising, a housing in which said mold of said hollow fibers membrane module or said capillaries membrane module is disposed in said housing in such a manner that a feed space and a permeate space are formed, wherein said housing includes a lumen inlet, a lumen outlet, an exterior inlet and an exterior outlet, and a seal between each of said feed space and said permeate space, said lumen inlet and said lumen outlet, and said exterior inlet and said exterior outlet, each said seal being present between said mold and said housing.

16. A device according to claim 15, wherein said housing is designed as a metallic cartridge.

17. A device according to claim 15, wherein said mold is cylindrical in shape, is held in said housing by at least one plug inserted at a front end of said housing, and is pressed to a tight fit by each said seal disposed at the front end between said mold and said housing.

18. A device having a hollow fibers membrane module or a capillaries membrane module provided according to claims 12 or 13, wherein said housing includes a lumen inlet, a lumen outlet, an exterior inlet, and an exterior outlet, and a seal between each of said feed space and said permeate space, said lumen inlet and said lumen outlet, and said exterior inlet and said exterior outlet, each said seal being present between said mold and said housing.

19. A device according to claim 18, wherein said housing is designed as a metallic cartridge.

20. A device according to claim 18, wherein said mold is cylindrical in shape, is held in said housing by at least one plug inserted at a front end of said housing, and is pressed to a tight fit by each said seal disposed at the front end between said mold and said housing.

* * * * *

UNITED STATES PATENT AND TRADEMARK OFFICE
CERTIFICATE OF CORRECTION

PATENT NO. : 6,887,304 B2  Page 1 of 1
APPLICATION NO. : 10/471091
DATED : May 3, 2005
INVENTOR(S) : Norbert Stroh et al.

It is certified that error appears in the above-identified patent and that said Letters Patent is hereby corrected as shown below:

On the face of Patent, line (73) Assignee, should read

-- [73] Assignee: Fraunhofer-Gesellschaft zur Forderung der angewandten Forschung e.V., Munich (DE) --.

Column 3,
Lines 37 and 38, "$0.5 \times 10^{-}{}_{6}K^{-1}$" should read -- $0.5 \times 10^{-6} K^{-1}$ --.

Column 8,
Line 43, "or 30" should read -- or 14 --.

Signed and Sealed this

Twenty-sixth Day of September, 2006

JON W. DUDAS
*Director of the United States Patent and Trademark Office*